United States Patent
Buss et al.

(10) Patent No.: US 12,264,213 B2
(45) Date of Patent: Apr. 1, 2025

(54) PREPARATION OF AN AQUEOUS DISPERSION OF ACRYLATE-SILOXANE COPOLYMER PARTICLES

(71) Applicants: Dow Global Technologies LLC, Midland, MI (US); Dow Silicones Corporation, Midland, MI (US); Rohm and Haas Company, Collegeville, PA (US)

(72) Inventors: Hilda G. Buss, Norristown, PA (US); Matthew Carter, Bala Cynwyd, PA (US); Ralph C. Even, Blue Bell, PA (US); Bryan L. McCulloch, Olympia, WA (US); Jodi Mecca, Midland, MI (US); Richard P. Woodworth, North Wales, PA (US); Fanwen Zeng, Audubon, PA (US)

(73) Assignees: Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 631 days.

(21) Appl. No.: 17/632,073

(22) PCT Filed: Aug. 10, 2020

(86) PCT No.: PCT/US2020/045561
§ 371 (c)(1),
(2) Date: Feb. 1, 2022

(87) PCT Pub. No.: WO2021/041011
PCT Pub. Date: Mar. 4, 2021

(65) Prior Publication Data
US 2022/0275124 A1    Sep. 1, 2022

Related U.S. Application Data

(60) Provisional application No. 62/893,999, filed on Aug. 30, 2019.

(51) Int. Cl.
| | | |
|---|---|---|
| *C08F 220/18* | (2006.01) | |
| *C07F 7/08* | (2006.01) | |
| *C08F 2/22* | (2006.01) | |
| *C08F 220/06* | (2006.01) | |
| *C08F 220/14* | (2006.01) | |
| *C08F 230/08* | (2006.01) | |

(52) U.S. Cl.
CPC .......... *C08F 220/1804* (2020.02); *C08F 2/22* (2013.01); *C08F 220/06* (2013.01); *C08F 220/14* (2013.01); *C08F 230/08* (2013.01); *C08F 230/085* (2020.02); *C07F 7/0879* (2013.01); *C08F 2800/20* (2013.01)

(58) Field of Classification Search
CPC ................................ C08F 230/08; C08F 2/22
USPC .......................................... 526/279; 524/806
See application file for complete search history.

(56) References Cited

U.S. PATENT DOCUMENTS

| | | | |
|---|---|---|---|
| 5,731,379 A | 3/1998 | Kennan et al. | |
| 5,840,813 A | 11/1998 | Gornowicz et al. | |
| 2009/0186982 A1 | 7/2009 | Minge et al. | |
| 2016/0122575 A1* | 5/2016 | Yang | C09D 133/14 524/547 |
| 2017/0260393 A1 | 9/2017 | Phukan et al. | |

FOREIGN PATENT DOCUMENTS

| | | |
|---|---|---|
| CN | 105601799 B * | 3/2018 |
| WO | 9010028 | 9/1990 |

OTHER PUBLICATIONS

Cai, "Synthesis Of Novel Polymethacrylates With Siloxyl Bridging Perfluoroakyl Side Chains for Hydrophobic Application on Cotton Fabrics", Applied Surface Science, 2016, p. 453-467, vol. 341.
Lin, "Silicone-Polyacrylate Composite Latex Particles. Particles Formation and Film Properties", 2005, p. 1331-1337.
Rodriguez, "Correlation of Silicone Incorporation Into Hybrid Acrylic Coatings With the Resulting Hydrophobic and Thermal Properties", 2008, p. 8537-8546, vol. 41.
Rodriguez, "Polymerization Strategies to Overcome Limiting Monomer Conversion in Silicone-Acrylic Miniemulsion Polymerization", 2008, p. 691-696.
Xiao, "Organosilicone Modification of Allyl Methacrylate with Speier's Catalyst For Waterborne Self-Matting Styrene-Acrylic Emulsion", Progress in Organic Coatings, 2018, p. 1-6.

(Continued)

*Primary Examiner* — Marc S Zimmer
*Assistant Examiner* — Surbhi M Du
(74) *Attorney, Agent, or Firm* — Reid S. Willis

(57) ABSTRACT

The present invention relates to a method for preparing an aqueous dispersion of acrylate-siloxane copolymer particles as described herein. The polymer particles comprise structural units of an acrylate monomer; an acid monomer; and a siloxane acrylate monomer of formula I:

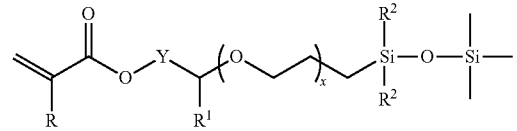

where R, $R^1$, $R^2$, Y and x are as defined herein. The method provides an efficient way to prepare a high solids content aqueous dispersion of siloxane-acrylate hybrid copolymers with efficient incorporation of siloxane acrylate monomers, low residual monomer, and low generation of unwanted coagulum. The dispersion is useful for forming coatings with improved hydrophobicity, stain resistance, and aesthetic/haptic properties compared with conventional all-acrylic compositions.

6 Claims, No Drawings

(56) References Cited

OTHER PUBLICATIONS

Yoon, "Preparation and Adhesive Properties of Acrylate Copolymer with Siloxane Group", 2007, p. 121-125, vol. 18, No. 2.
Zhang, "A Novel Approach For the Preparation of Organic-Siloxane Oligomers and the Creation of Hydrophobic Surface", Applied Surface Science, 2007, p. 452-458.
PCT/US20/044985.

* cited by examiner

PREPARATION OF AN AQUEOUS DISPERSION OF ACRYLATE-SILOXANE COPOLYMER PARTICLES

BACKGROUND OF THE INVENTION

The present invention relates to an aqueous dispersion of copolymer particles comprising structural units of an acrylate monomer and a siloxane-acrylate monomer.

Siloxane-acrylate hybrid latex compositions, which comprise polymer particles prepared by the polymerization of acrylates and siloxane-functionalized monomers, are desirable because they form coatings with improved hydrophobicity, stain resistance, and aesthetic/haptic properties compared with conventional all-acrylic compositions. Unfortunately, methods used to prepare these hybrid systems—as described in, for example, Xiao, J. et al., Prog. Org. Coat. 2018, 116, 1-6; and Zhang, B. et al., Appl. Surf. Sci. 2007, 254, 452-458—have been shown by the present inventors to result in the formation of latexes with unacceptably high levels of unreacted residual monomer and/or unwanted gelled oligomeric byproducts at a commercially useful concentration of solids. The formation of high concentrations of gel, which is a strong indicator of an inefficient process, can lead to reactor fouling and contribute to inferior properties of the final coating.

Blends of all-acrylic polymer particles and siloxane-based polymer particles, on the other hand, suffer from phase separation upon drying, which is manifested by the formation of optically hazy films as well as macrophase separation and substrate de-wetting.

Accordingly, it would be advantageous to prepare aqueous dispersions of siloxane-acrylate hybrid copolymer particles at high solid levels with an acceptably low levels of gel formation and unreacted monomer and a high incorporation of silicon.

SUMMARY OF THE INVENTION

The present invention addresses a need in the art by providing, in one aspect, a composition comprising an aqueous dispersion of polymer particles having a z-average particle size in the range of from 50 nm to 500 nm and comprising, based on the weight of the polymer particles, a) from 40 to 98.8 weight percent structural units of an acrylate monomer; b) from 0.1 to 5 weight percent structural units of an acid monomer; and c) from 1 to 59.8 weight percent structural units of a siloxane acrylate monomer having the following formula I:

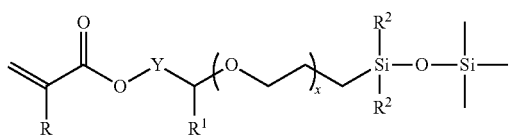

where R is H or $CH_3$;
$R^1$ is H or $CH_3$;
each $R^2$ is independently $CH_3$ or $O-Si(CH_3)_3$;
Y is $-CH_2-$ or $-CH_2CH_2-$; and
x is 0 or 1;
with the proviso that when x is 1, $R^1$ is H; when Y is $-CH_2-$, $R^1$ is H; and when Y is $-CH_2CH_2-$, $R^1$ is $CH_3$ and x is 0;

wherein the solids content of the polymer particles in the aqueous dispersion is in the range of 30 to 55 weight percent and a) the aqueous phase of the aqueous dispersion comprises not greater than 1000 ppm of monomer of formula I; or b) the aqueous phase of the aqueous dispersion comprises not greater than 10000 ppm of coagulum.

In a second aspect, the present invention is a method of preparing an aqueous dispersion of acrylate-siloxane copolymer particles comprising the steps of:

1) contacting an aqueous monomer emulsion with an initiator in a stirred vessel and in the presence of water and a surfactant and at a temperature maintained in the range of from 60° C. to 95° C., then
2) allowing sufficient time to achieve substantially complete conversion of the monomers to polymer particles comprising structural units of the monomers;

wherein the monomer emulsion comprises, based on the weight of monomers, a) from 40 to 98.8 weight percent of an acrylate monomer; b) from 0.1 to 5 weight percent of an acid monomer; and c) from 1 to 59.8 weight percent of a siloxane acrylate monomer of formula I:

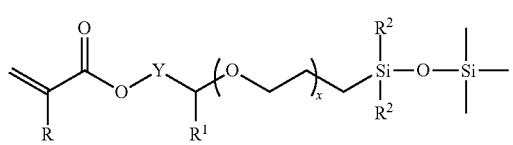

where R, $R^1$, $R^2$, Y and x are as previously defined.

The composition of the present invention addresses a need by providing a dispersion of siloxane-acrylate hybrid copolymer particles with a) a relatively high degree of silicon incorporation; b) a high solids content; and c) low residual monomer.

DETAILED DESCRIPTION OF THE INVENTION

In a first aspect, the present invention is a composition comprising an aqueous dispersion of polymer particles having a z-average particle size in the range of from 50 nm to 500 nm and comprising, based on the weight of the polymer particles, a) from 40 to 98.8 weight percent structural units of an acrylate monomer; b) from 0.1 to 5 weight percent structural units of an acid monomer; and c) from 1 to 59.8 weight percent structural units of a siloxane acrylate monomer having the following formula I:

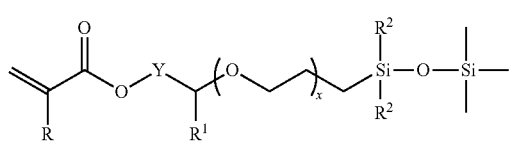

where R is H or $CH_3$;
$R^1$ is H or $CH_3$;
each $R^2$ is independently $CH_3$ or $O-Si(CH_3)_3$;
Y is $-CH_2-$ or $-CH_2CH_2-$; and
x is 0 or 1;

with the proviso that when x is 1, $R^1$ is H; when Y is —CH$_2$—, $R^1$ is H; and when Y is —CH$_2$CH$_2$—, $R^1$ is CH$_3$ and x is 0;

wherein the solids content of the polymer particles in the aqueous dispersion is in the range of 30 to 55 weight percent and a) the aqueous phase of the aqueous dispersion comprises not greater than 1000 ppm of monomer of formula I; or b) the aqueous phase of the aqueous dispersion comprises not greater than 10000 ppm of coagulum.

As used herein, the term "structural unit" of a recited monomer refers to the remnant of the monomer after polymerization. For example, a structural unit of methyl methacrylate (MMA) is as illustrated:

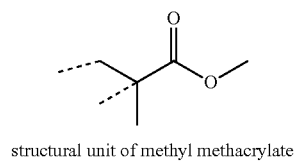

structural unit of methyl methacrylate where the dotted lines represent the points of attachment of the structural unit to the polymer backbone.

As used herein, the term "acrylate monomer" refers to one or more acrylate and/or methacrylate monomers. Examples of suitable acrylate monomers including MMA, n-butyl methacrylate (BMA), ethyl acrylate (EA), n-butyl acrylate (BA), and 2-ethylhexyl acrylate (2-EHA). Preferably, at least 80, and more preferably at least 90 weight percent of the acrylate monomer is a combination of MMA and BA.

The copolymer preferably also comprises from 0.1 to 5 weight percent, based on the weight of the copolymer, structural units of an acid monomer such as a carboxylic acid monomer, a phosphorus acid monomer, or a sulfur acid monomer. Examples of carboxylic acid monomers include acrylic acid (AA), methacrylic acid (MAA), and itaconic acid (IA), and salts thereof.

Suitable phosphorus acid monomers including phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including phosphoethyl methacrylate (PEM) and phosphopropyl methacrylates.

Examples of suitable sulfur acid monomers include sulfoethyl methacrylate, sulfopropyl methacrylate, styrene sulfonic acid, vinyl sulfonic acid, and 2-acrylamido-2-methyl propanesulfonic acid (AMPS), and salts thereof.

Preferably, the copolymer comprises structural units of MMA, BA, MAA, and the siloxane acrylate monomer of formula I.

In one aspect, the weight-to-weight ratio of structural units of BA to structural units of MMA is in the range of from 45:55 to 55:45; in another aspect, the weight-to-weight ratio of structural units of total acrylate monomer, preferably BA and MMA, to acid monomer, preferably MAA, is in the range of from 99.95:0.05 to 98:2. In another aspect, the weight percent of structural units of the siloxane acrylate monomer, based on the weight of the polymer particles, is in the range of from 5 to 30 percent.

In another aspect, the polymer particles comprise, based on the weight of the polymer particles, preferably from 2, more preferably from 3, and most preferably from 8 weight percent of the siloxane monomer, to preferably 50, more preferably to 40, more preferably to 30, and most preferably to 20 weight percent structural units of the siloxane acrylate monomer.

Preferably, the polymer particles comprise, from 3, and more preferably from 5 weight percent silicon, to 30, and preferably to 20 weight percent silicon, based on the weight of the polymer particles.

Preferably, the weight-to-weight ratio of structural units of the siloxane acrylate monomer to the siloxane acrylate monomer in the composition is at least 98:2; more preferably 99:1; and most preferably at least 99.9:0.1, as determined by $^1$H NMR spectroscopy as described herein.

Examples of monomers of formula I include:

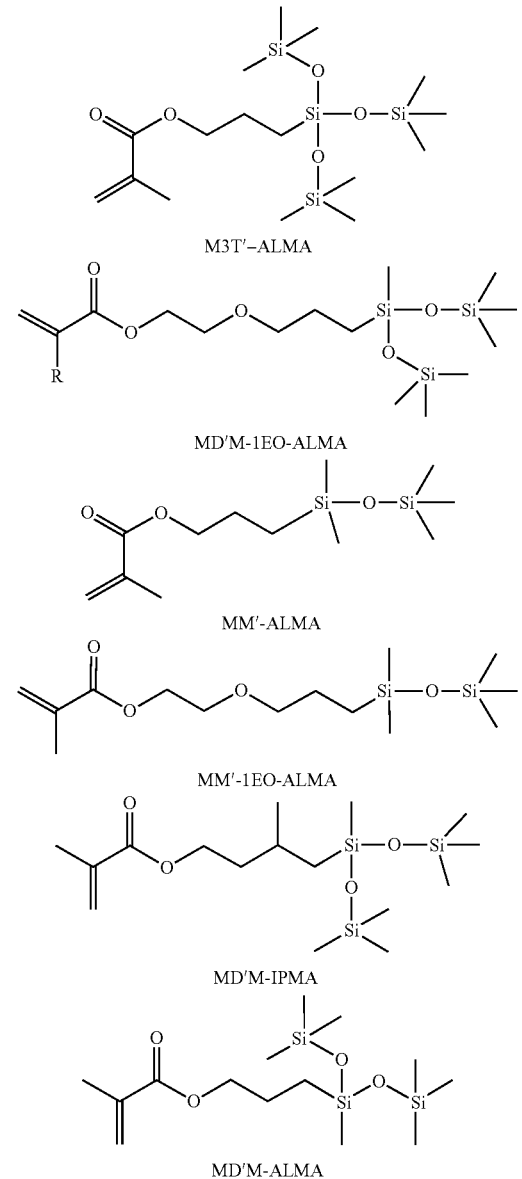

M3T'-ALMA

MD'M-1EO-ALMA

MM'-ALMA

MM'-1EO-ALMA

MD'M-IPMA

MD'M-ALMA

In another aspect the present invention is a method of preparing an aqueous dispersion of acrylate-siloxane copolymer particles preferably comprising the steps of:
1) adding a first portion of an aqueous monomer emulsion having an average monomer droplet size in the range of from 1 µm to 30 µm into a stirred vessel containing water and a surfactant and heated to a temperature in the range of from 60° C., preferably from 80° C. to 95° C.; then 2) adding a first portion of an initiator to the vessel to form, over time, an aqueous dispersion of seed polymer particles; then 3) gradually adding a second portion of the monomer emulsion and a second portion of the initiator to the vessel; then 4) maintaining the temperature in the range of 60° C., preferably from 80° C. to 95° C. for a sufficient time to achieve substantially complete conversion of the monomers to polymer particles comprising structural units of the monomers;

wherein the monomer emulsion comprises, based on the weight of monomers, a) from 40 to 98.8 weight percent of an acrylate monomer; b) from 0.1 to 5 weight percent of an acid monomer; and c) from 1 to 59.8 weight percent of a siloxane acrylate monomer of formula

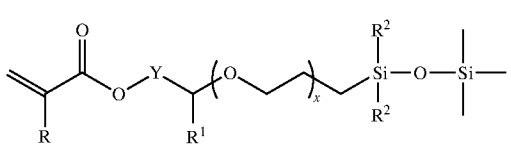

I where R is H or $CH_3$;
$R^1$ is H or $CH_3$;
each $R^2$ is independently $CH_3$ or $O—Si(CH_3)_3$;
Y is $—CH_2—$ or $—CH_2CH_2—$; and
x is 0 or 1;
with the proviso that when x is 1, $R^1$ is H; when Y is $—CH_2—$, $R^1$ is H; and when Y is $—CH_2CH_2—$, $R^1$ is $CH_3$ and x is 0.

Preferably, after step 4), a redox initiator package is added to the vessel; it is also preferred after step 4) to neutralize the aqueous dispersion to a pH in the range of from 6.5 to 7.5. More preferably, it is preferred after step 4) to add the redox initiator package followed by neutralization.

In a more particularly preferred method, the composition of the present invention is prepared by emulsion polymerization wherein a monomer emulsion comprising the acrylate monomer, preferably a combination of BA and MMA; the acid monomer, preferably MAA; and the siloxane acrylate monomer dispersed in water are homogenized in the presence of a surfactant and preferably a chain transfer agent to produce a monomer emulsion having an average particle size in the range of from 1 to 30 μm as determined by optical microscopy.

The monomer emulsion and an initiator such as ammonium persulfate are then fed over a period of from 30 minutes to 6 hours into a heated reactor (typically in the range of from 85° C. to 90° C.) containing water and a surfactant. The reactor is held for a sufficient time to substantially complete polymerization, generally from 15 minutes to 2 hours, after which time the reactor is cooled to around 60° C. The contents are then preferably treated with a redox pairing agent (also known as a redox initiator package) such as t-amyl hydroperoxide/isoascorbic acid and then neutralized. The polymer particles prepared by this method preferably have a z-average particle size in the range of from 80 nm to 200 nm, more preferably to 150 nm.

It has been discovered that an aqueous dispersion of polymer particles comprising structural units of an acrylate monomer and the siloxane-acrylate monomer of formula I can be achieved at a solids content in the range of from 30, preferably from 35, and most preferably from 38 weight percent, to 55, preferably to 50, and most preferably to 45 weight percent, with at least 70 mole percent, preferably at least 80 mole percent, more preferably at least 90 mole percent, and most preferably quantitative incorporation, as determined using $^1$H NMR spectroscopy as described herein, of the siloxane acrylate monomer into the latex polymer particles. Consequently, the dispersion preferably comprises not greater than 1000 ppm, more preferably not greater than 500 ppm, more preferably not greater than 100 ppm, and most preferably not greater than 30 ppm of residual unreacted monomer. It is also preferred that the amount of coagulum (gel) generated is not greater than 10000 ppm, more preferably not greater than 7600 ppm, and most preferably not greater than 5000 ppm. Preferably, the amount of residual monomer is not greater than 1000 ppm and the amount of gel generated is not greater than 10000 ppm. Coagulum concentration is determined by isolating the residuum by filtration of the composition through successive stainless steel mesh screens of pore sizes 150 μm and 40 μm; thus, by inference, the coagulum has a particle size of >40 μm.

Particle Sizing Method

Particle sizes were measured using a Malvern Zetasizer Nano ZS90, which measures Z-average particle size ($D_z$) using dynamic light scattering (DLS) at a scattering angle of 90° using Zetasizer software version 7.11. A drop of the sample dispersion was diluted using an aqueous solution of MilliQ water (18.2 MΩcm at 25° C.) to achieve a particle count in the range of 200-400 thousand counts/s (Kcps). Particle size measurements were carried using instrument's particle sizing method and $D_z$ was computed by the software. $D_z$ is also known as the intensity-based harmonic mean average particle size and expressed as;

$$D_Z = \frac{\Sigma S_i}{\Sigma (S_i / D_i)}$$

Here, $S_i$ is scattered intensity from particle i with diameter $D_i$. Detailed $D_z$ calculations are described in ISO 22412: 2017 (Particle size analysis—Dynamic light scattering (DLS)).

Incorporation and Hydrolysis of Silicone-Containing Monomer NMR Spectroscopic Method The process to determine % incorporation of silicone monomer is as follows. A sample was diluted in water ~10× with a known mass of deionized water, placed into an LDPE centrifuge tube and spun at 100 k for 20 min. The supernatant was removed from the tube and the solid polymer at the bottom of the tube was rinsed copiously with deionized water. The spun-down polymer sample remaining in the centrifuge tube was dried at room temperature for 48 h. A known mass of polymer sample was dissolved in ~2-5 mL of $CHCl_3$ and $^1$H NMR spectroscopy was performed using a Bruker 300 MHz NMR. Spectra acquired were an average of 32 scans with a relaxation delay of 10 s. The ratio of the integration value of the siloxane peak (~0.0-0.1 ppm) and the integration values of the butyl acrylate (3.7-4.1 ppm, —(C=O)—CH$_2$—) and methyl methacrylate sidechain peaks (3.4-3.6 ppm, —CH$_3$) was used to compute the composition of the sample (all chemical shifts relative to the residual protons of CDCl$_3$ at 7.26 ppm), and these values were compared to the monomer emulsion (ME) composition in order to estimate the overall % incorporation of silicone-containing monomer.

Determination of Siloxane Acrylate Monomer in Serum Phase by UHPLC-MS

UPHLC-MS performed on a Waters Acquity® Ultra Performance Liquid Chromatography (UPLC) system equipped with a Waters Acquity® UPLC BEH-C18 (1×50 mm) column coupled to a Waters Acquity photodiode array (PDA) detector operating over the wavelength range 190-500 nm. Standards were prepared by serial dilution of a stock solution of known concentration of monomer (~1 wt %) in acetonitrile. Samples were prepared in duplicate, by the dilution of a known mass of sample in ~30× in acetonitrile, followed by agitation for ~2 h. Samples were then centrifuged for 15 min at 43000 RPM. The supernatant was removed by pipette and filtered using a 0.2 μm PTFE syringe filter for injection into the instrument. The injection volume of sample was 2.0 μL and the injection mode was partial-loop with a needle overfill of 5 μL. The instrument operated at a flow rate of 0.1 mL/min and column temperature of 40° C. using mobile phase (A): 0.1 wt % formic acid in H$_2$O and mobile phase (B): 0.1 wt % formic acid in acetonitrile. The solvent gradient was programmed as follows: 85/15 (v/v) (A)/(B) for 2.75 min, up to 99/1 (A)/(B) over 0.25 min, held at 99/1 (A)/(B) for 1.0 min, down to 85/15 (A)/(B) over 0.25 min, and then held at 85/15 (A)/(B) for 1.75 min The LOD of the method was 30 ppm.

EXAMPLES

Intermediate Example 1—Preparation of MD'M-IPMA

A. Preparation of Isoprenyl MD'M Alcohol

Isoprenol (165.8 g) was charged into a 4-neck 1-L round bottom flask equipped with a mechanical stirrer, a thermocouple, and a water-cooled condenser adapted to a N$_2$ bubbler. The unfilled space of the flask was purged with N$_2$ for 3 min. The flask was heated and 15 ppm of Pt was added to the flask. 1,1,1,3,5,5,5-Heptamethyltrisiloxane (MD'M, 385.0 g) was added into the flask over 1.5 h to control the pot temperature in the range of 80-90° C. The mixture was stirred for another 1.5 h at 80-90° C. FTIR spectroscopy indicated that the Si—H vibrational peak (~2140 cm$^{-1}$) had completely disappeared. Volatiles were removed in vacuo at 50° C. for 1 h at <1 mm Hg. The crude product (512 g) was a brown colored liquid. Activated carbon (23 g) was added and the mixture was stirred for 2 h before it was filtered through a 0.45-μm filter membrane. A clear colorless final product (495.4 g) was collected (yield 92.8%). $^1$H, $^{13}$C, and $^{29}$Si NMR spectroscopy as well as GC-FID were used to characterize the product.

B. Preparation of MD'M-IPMA

Isoprenyl MD'M alcohol (155.3 g), MMA (152.4 g) and Zr(acac)$_4$ (3.34 g) were charged into a 1-L 4-neck round bottom flask, fitted with an overhead stirrer, a temperature controller with over temperature protection, an overhead temperature monitor, a gas inlet tube, and a 10-plate Oldershaw distillation column/distillation head with an automated reflux splitter/controller. Hydroquinone monomethyl ether (280 mg) and 4-hydroxy-TEMPO (20 mg) were then added to the reaction mixture to achieve 1338 ppm and 288 ppm, respectively, in the final product. A gas purge (8% O$_2$ in N$_2$) was initiated, and stirring was commenced. A sample of pot contents was taken for NMR spectroscopic analysis. The flask pressure was reduced to 550 mm Hg and the pot contents were heated slowly to between 96-106° C. and refluxed for about 1 h. The vapor temperature stabilized between 58-56° C. An MMA-methanol azeotrope was distilled off at a vapor temperature of 56° C. using a reflux ratio of 70:30. The distillation was continued until the vapor temperature reached 65° C. The contents of the flask were allowed to cool to 70° C., whereupon an aliquot was removed for $^1$H NMR spectroscopic analysis. Excess MMA was removed from the final monomer via distillation at pot temperature of 65° C. and 150 mm Hg. The final product was an amber colored low viscosity liquid (185 g).

Example 1

Preparation of an Aqueous Dispersion of Hybrid Polymer Particles using MM'-ALMA

Deionized water (50.0 g) and Polystep B-5-N sodium lauryl sulfate (SLS, 0.5 g, 28.0% in water) were added to a 500-mL, 4-neck round bottom flask outfitted with a condenser, overhead stirrer, and thermocouple. The contents of the reactor were stirred at 250 rpm and heated to 88° C. under N$_2$. In a separate vessel, a monomer emulsion (ME) containing deionized water (60.0 g), SLS (4.7 g, 28.0% in water), BA (45.0 g), MMA (45.0 g), MAA (1.0 g), MM'-ALMA (10.0 g), n-dodecyl mercaptan (n-DDM, 0.05 g), ammonium hydroxide solution (0.36 g, 28% active in water), and sodium acetate (0.3 g) was prepared using an overhead mixer followed by treatment with a handheld homogenizer (Tissue Tearor, Model 985370, Biospec Products Inc.) for 1 min to produce an ME with average droplet size of ~2-15 μm, as determined by optical microscopy. A portion of the ME (1.75 g) was added to the reactor with rinsing (5.0 g water), followed by the addition of ammonium persulfate (0.03 g) with rinsing (2.0 g water). The remainder of the ME and a solution of ammonium persulfate (0.11 g in 8.0 g water) were fed simultaneously into the reactor over 120 min, at a temperature of 87-88° C. Upon completion of the feeds, the reactor was then held for an additional 30 min at 87-88° C. The reactor was then cooled to 60° C. and separate solutions of (i) Luperox TAH 85 tert-amyl hydroperoxide (t-AHP, 85 wt % active in water), SLS (0.02 g, 28% active in water), and deionized water (1.0 g) and (ii) isoascorbic acid (IAA, 0.05 g), VERSENE™ (EDTA, A Trademark of Dow, Inc. or its Affiliates; 0.1 g, 1% active in water), and iron (II) sulfate solution (10.0 g, 0.15% active in water) were added to the reactor. The reactor was then cooled to room temperature, whereupon ammonium hydroxide solution (28% active in water) was added dropwise to adjust the pH to ~7.0. The aqueous dispersion was filtered successively through stainless steel mesh screens of pore sizes 150 μm and 40 μm. The final aqueous particle dispersion had a solids of 40%, a z-average particle size of 112 nm, 2900 ppm of coagulum, and quantitative incorporation of MM'-ALMA monomer as determined $^1$H NMR spectroscopy. The level of residual MM'-ALMA in the sample was <30 ppm as determined by UHPLC.

Example 2

Preparation of an Aqueous Dispersion of Hybrid Polymer Particles using MM'-1EO-ALMA Example 1 was repeated, except that the monomer emulsion was prepared by combining deionized water (60.0 g), SLS (4.7 g, 29% active in water), BA (45.0 g), MMA (45.0 g), MAA (1.0 g), MM'-1EO-ALMA (10.0 g), n-DDM (0.05 g), ammonium hydroxide solution (0.36 g, 28% active in water), and sodium acetate (0.30 g). The final aqueous particle dispersion had a solids of 40%, z-average particle size of 100 nm, 6300 ppm of coagulum, and quantitative incorporation of MM'-1EO-ALMA monomer as determined by $^1$H NMR spectroscopy. The level of residual MM'-1EO-ALMA in the sample was found to be <100 ppm by UHPLC.

Example 3

Preparation of an Aqueous Dispersion of Hybrid Polymer Particles using MD'M-ALMA Example 1 was repeated, but the monomer emulsion was prepared by combining deionized water (60.0 g), SLS (4.7 g, 29% active in water), BA (45.0 g), MMA (45.0 g), MAA (1.0 g), MD'M-ALMA (10.0 g), n-DDM (0.05 g), ammonium hydroxide solution (0.36 g, 28% active in water), and sodium acetate (0.30 g). The final aqueous particle dispersion had a solids of 40%, z-average particle size of 104 nm, 7600 ppm of coagulum, and quantitative incorporation of MD'M-ALMA monomer as determined by $^1$H NMR spectroscopy. The level of residual MD'M-ALMA in the sample was found to be <30 ppm by UHPLC.

Example 4

Preparation of an Aqueous Dispersion of Hybrid Polymer Particles using MD'M-IPMA Example 1 was repeated, but the monomer emulsion was prepared by combining deionized water (60.0 g), SLS (4.7 g, 29% active in water), BA (45.0 g), MMA (45.0 g), MAA (1.0 g), MD'M-IPMA (10.0 g), n-DDM (0.05 g), ammonium hydroxide solution (0.36 g, 28% active in water), and sodium acetate (0.30 g). The final aqueous particle dispersion had a solids of 40%, z-average particle size of 107 nm, 2500 ppm of coagulum, and quantitative incorporation of MD'M-IPMA monomer as determined by $^1$H NMR spectroscopy. The level of residual MD'M-IPMA in the sample was found to be <100 ppm by UHPLC.

Example 5

Preparation of an Aqueous Dispersion of Hybrid Polymer Particles using M3T'-ALMA Example 1 was repeated, but the monomer emulsion was prepared by combining deionized water (60.0 g), SLS (4.7 g, 29% active in water), BA (45.0 g), MMA (45.0 g), MAA (1.0 g), M3T'-ALMA (10.0 g), n-DDM (0.05 g), ammonium hydroxide solution (0.36 g, 28% active in water), and sodium acetate (0.30 g). The final aqueous particle dispersion had a solids of 41%, z-average particle size of 106 nm, 5000 ppm of coagulum, and 73% incorporation of M3T'-ALMA monomer as determined by $^1$H NMR spectroscopy. The level of residual M3T'-ALMA in the sample was <300 ppm as determined by UHPLC.

Comparative Example 1

Preparation of an Aqueous Dispersion of Hybrid Polymer Particles using Butyl-MDSM'-ALMA

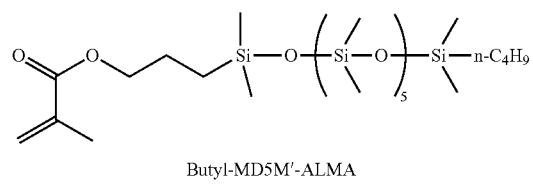

Butyl-MD5M'-ALMA

Example 1 was repeated, but the monomer emulsion was prepared by combining deionized water (60.0 g), SLS (4.7 g, 29% active in water), BA (45.0 g), MMA (45.0 g), MAA (1.0 g), Butyl-MDSM'-ALMA (10.0 g), n-DDM (0.05 g), ammonium hydroxide solution (0.36 g, 28% active in water), and sodium acetate (0.30 g). The final aqueous particle dispersion had a solids of 39%, z-average particle size of 87 nm 11,000 ppm of coagulum, and 11% incorporation of butyl-Butyl-MDSM'-ALMA monomer as determined by $^1$H NMR spectroscopy. The level of residual Butyl-MDSM'-ALMA in the sample was 1620 ppm as determined by UHPLC.

Comparative Example 2

Preparation of an Aqueous Dispersion of Hybrid Polymer Particles using MD'M-ALMA by Xiao Process The process to prepare an aqueous dispersion of hybrid particles as described in Xiao, J. et al., *Prog. Org. Coatings* 2018, 116, 1-6 was reproduced. The synthesis was carried out using a 500-mL, 4-neck round bottom flask outfitted with a condenser, overhead stirrer, and thermocouple. Deionized water (19.0 g) and SLS (1.43 g, 28.0% in water), TRITON™ X-100 Polyethylene glycol t-octylphenyl ether (A Trademark of Dow, Inc. or its affiliates, 0.80 g), and sodium bicarbonate (NaHCO$_3$; 0.40 g) were added to the flask. The contents of the reactor were stirred at 100 rpm and heated to 60° C. under N$_2$. In a separate vessel, an ME containing deionized water (48.5 g), SLS (2.14 g, 28.0% in water), X-100 (1.20 g), BA (BA; 44.8 g), MMA (42.3 g), styrene (10.1 g), and AA (1.9 g) was prepared using an overhead mixer. A portion of the ME (15.1 g) was added to the reactor, followed by the addition of ammonium persulfate (0.13 g) in deionized water (10.0 g), and the reactor temperature was increased to 80° C. over 10 min. The remainder of the ME and a solution of ammonium persulfate (0.27 g in 20.0 g water) were fed simultaneously into the reactor over 4.5 h and 5 h, respectively, at a temperature of 80-81° C. (i.e., the ammonium persulfate feed continued for 30 min past the completion of the ME feed). At the 3-h mark of feeds, MD'M-ALMA was added to the reactor (10.0 g). Upon completion of the ammonium persulfate feed, the reactor was then held for an additional 30 min at 80° C. The reactor was then cooled to room temperature and ammonium hydroxide solution (28% active in water) was added dropwise to raise the pH to ~8.5. The aqueous dispersion was filtered successively through stainless steel mesh screens of pore sizes of 150 μm. The final aqueous particle dispersion had a solids of 44% (theoretical=53%), z-average particle size of 135 nm, 8000 ppm of coagulum, and 37% incorporation of MD'M-ALMA monomer as determined by $^1$H NMR spectroscopy. The level of residual MD'M-ALMA in the serum phase was 13,700 ppm as determined by UHPLC.

Comparative Example 3

Preparation of an Aqueous Dispersion of Hybrid Polymer Particles using MD'M-ALMA by Zhang Process The process to prepare an aqueous dispersion of hybrid particles as described in Zhang, B. et al., *Appl. Surf. Sci.* 2007, 254, 452-458 was reproduced. Deionized water (60.0 g), sodium dodecylbenzene sulfonic acid (0.30 g), and sorbitani monolaurate (0.50 g) were added to a 100-mL glass reactor equipped with a condenser, overhead stirrer, and thermocouple. The reactor contents were stirred at 100 rpm, heated to 80° C., and sparged with $N_2$ for 30 min. In a separate vessel, a monomer mixture composed of MMA (12.0 g), BA (12.0 g), and MD'M-ALMA (1.2 g) was prepared. The monomer mixture and a solution of ammonium persulfate (0.05 g in 10.0 g water) were fed simultaneously into the reactor over 120 min, at a temperature of 80-81° C. Upon completion of the feeds, the reactor was then held for an additional 6 h at 80-81° C. The reactor was then cooled to room temperature, whereupon ammonium hydroxide solution (28% active in water) was added dropwise to raise the pH to ~7.0. The aqueous dispersion was filtered successively through stainless steel mesh screens of pore sizes 40 μm and 150 μm. The final aqueous particle dispersion had a solids of 23% (theoretical=26%), a z-average particle size of 64 nm, 20,000 ppm of coagulum, and 20% incorporation of MD'M-ALMA monomer as determined by $^1$H NMR spectroscopy. The level of residual MD'M-ALMA in the serum phase was 400 ppm (3.2% unreacted monomer, based on the weight of the monomer and the structural units of MD'M-ALMA in the polymer particles) as determined by UHPLC.

Table 1 illustrates the solids content, the residual monomer, and the coagulum generated for each sample.

TABLE 1

Solids Content, Residual Monomer, and Generated Coagulum

| Example | % solids | Monomer (ppm) | Coagulum (ppm) |
| --- | --- | --- | --- |
| 1 | 40 | <30 | 2900 |
| 2 | 40 | <100 | 6300 |
| 3 | 40 | <30 | 7600 |
| 4 | 40 | <100 | 2500 |
| 5 | 41 | <300 | 5000 |
| Comp. 1 | 39 | 1620 | 11000 |
| Comp. 2 | 44 | 13700 | 8000 |
| Comp. 3 | 23 | 400 | 20000 |

The Examples of the present inventions all were prepared with high solids content and undetected residual monomer and/or high solids content and low generation of coagulum. Table 2 illustrates the percent incorporation of Si atoms into the polymer particles:

TABLE 2

Si Content of Dispersed Polymer Particles

| Example | % Si by wt in polymer | number of Si atoms in monomer |
| --- | --- | --- |
| 1 | 2.0 | 2 |
| 2 | 1.7 | 2 |
| 3 | 2.4 | 3 |
| 4 | 2.2 | 3 |
| 5 | 2.0 | 4 |
| Comp. 1 | 0.3 | 7 |
| Comp. 2 | 0.8 | 3 |
| Comp. 3 | 0.2 | 3 |

The table illustrates two critical features of the invention: First, the process by which the dispersion of polymer particles are prepared matters; second, even if an efficient process is used, the siloxane acrylate monomer has to contain 2 to 4 siloxane groups to achieve optimal incorporation of this monomer into the polymer particles.

The invention claimed is:

1. A method of preparing an aqueous dispersion of acrylate-siloxane copolymer particles comprising the steps of:
   1) adding a first portion of an aqueous monomer emulsion into a stirred vessel containing water and a surfactant and heating the contents of the vessel to a temperature in the range of from 80° C. to 95° C.; then
   2) adding a first portion of an initiator to the vessel to form, over time, an aqueous dispersion of seed polymer particles; then
   2) gradually adding a second portion of the aqueous monomer emulsion and a second portion of the initiator to the vessel;
   4) maintaining the temperature in the range of from 80° C. to 95° C. for a sufficient time to achieve substantially complete conversion of the monomers to polymer particles comprising structural units of the monomers; then
   5) adding a redox initiator package to the vessel;
   wherein the monomer emulsion comprises, based on the weight of monomers, a) from 40 to 98.8 weight percent of an acrylate monomer; b) from 0.1 to 5 weight percent of an acid monomer; and c) from 1 to 59.8 weight percent of a siloxane acrylate monomer of formula I:

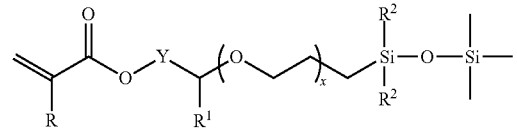

where R is H or $CH_3$;
$R^1$ is H or $CH_3$; and
each $R^2$ is independently $CH_3$ or O—Si$(CH_3)_3$;
Y is —$CH_2$— or —$CH_2CH_2$—; and
x is 0 or 1;
with the proviso that when x is 1, $R^1$ is H; when Y is —$CH_2$—, $R^1$ is H; and when Y is —$CH_2CH_2$—, $R^1$ is $CH_3$ and x is 0.

2. The method of claim 1 wherein the siloxane acrylate monomer of formula I is:

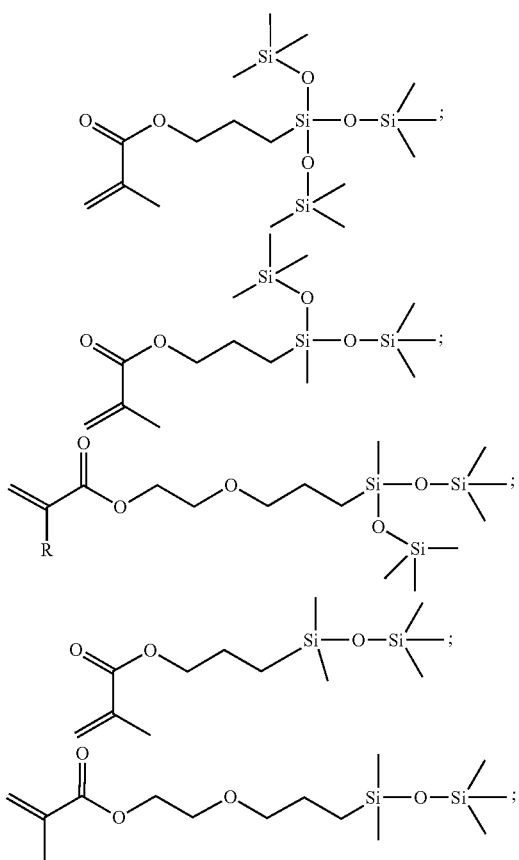

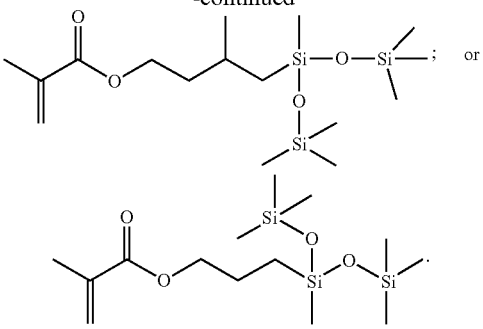

3. The method of claim 1 which further comprises the step of neutralizing the aqueous dispersion to a pH in the range of from 6.5 to 7.5.

4. The method of claim 1 which further comprises after step 4) the step of adding a redox initiator package to the vessel, followed by the step of neutralizing the aqueous dispersion to a pH in the range of from 6.5 to 7.5.

5. The method of claim 4 wherein at least 80 weight percent of the acrylate monomer comprises methyl methacrylate and butyl acrylate, wherein the weight-to-weight ratio of methyl methacrylate to butyl acrylate is in the range of from 45:55 to 55:45.

6. The method of claim 5 wherein the monomer emulsion comprises from 8 to 20 weight percent siloxane acrylate monomer and from 0.2 to 2 weight percent of the acid monomer based on the weight of monomers, wherein the acid monomer is methacrylic acid.

* * * * *